(No Model.) L. F. MILLS. 7 Sheets—Sheet 1.
CARBURETOR.

No. 281,108. Patented July 10, 1883.

Fig. 1.

Attest:
Walter D. Maclean
F. L. Middleton

Inventor
L. F. Mills
by Ellis Spear
Atty

(No Model.) 7 Sheets—Sheet 2.

L. F. MILLS.
CARBURETOR.

No. 281,108. Patented July 10, 1883.

(No Model.) 7 Sheets—Sheet 5.

L. F. MILLS.
CARBURETOR.

No. 281,108. Patented July 10, 1883.

(No Model.) 7 Sheets—Sheet 6.

L. F. MILLS.
CARBURETOR.

No. 281,108. Patented July 10, 1883.

Attest:
F. L. Middleton
W. E. Williams

Inventor:
L. F. Mills
by Ellis Spear
Atty.

(No Model.) 7 Sheets—Sheet 7.

L. F. MILLS.
CARBURETOR.

No. 281,108. Patented July 10, 1883.

Attest:
Walter Maldson
F. L. Middleton

Inventor:
L. F. Mills
by Ellis Spear
Atty.

United States Patent Office.

LUCIUS F. MILLS, OF IONIA, MICHIGAN.

CARBURETOR.

SPECIFICATION forming part of Letters Patent No. 281,108, dated July 10, 1883.

Application filed January 3, 1883. (No model.)

*To all whom it may concern:*

Be it known that I, LUCIUS F. MILLS, of Ionia, in the county of Ionia and State of Michigan, have invented a new and useful Improvement in Carburetors; and I do hereby declare that the following is a full, clear, and exact description of the same.

My invention relates to apparatus for manufacturing illuminating-vapor of gasoline mixed with atmospheric air or gases by what is known as the "cold process."

The principal objects of my invention are to secure uniform pressure of the mixed air or gas and hydrocarbon vapors; to provide means for regulating the proportions of the air or gas and the gasoline-vapors; to maintain such proportions once established; to saturate the air or gas uniformly with the vapors, and thus render the mixture of uniform quality throughout; to take up all the gasoline and prevent residuum; to prevent dangerous escape of the vapors; to cause the apparatus to work uniformly without regard to the number of burners in use within the capacity of the machine; to maintain the lights while winding up the weight, and to avoid undue and irregular friction on the spool, and, finally, to reduce the cost of the apparatus.

In the accompanying drawings, in which I have shown one mode of embodying my invention.

It will be understood from the preceding that in the apparatus to which my inventions pertain the illuminating vapors are formed by the steady and constant pressure of atmospheric air or gas over or through gasoline or other hydrocarbon liquid at ordinary natural temperatures, and that the air, when saturated or charged with the vapors, is forced by the constant pressure of the air behind it forward to the burners.

Figure 1:
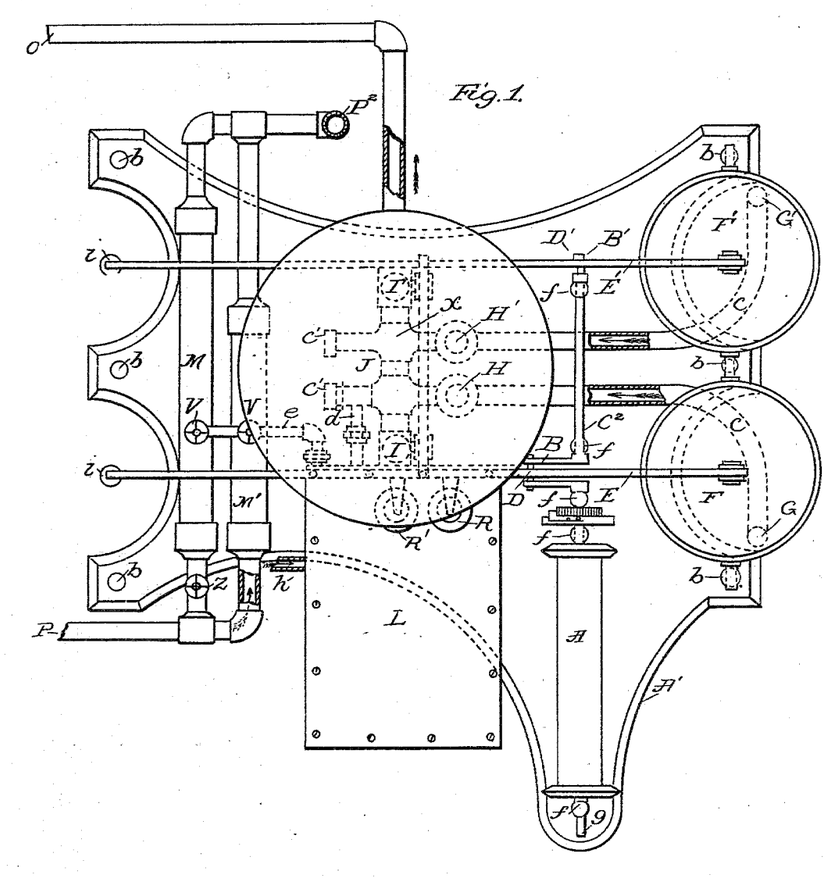
Figure 1 is a top view of the apparatus.
Figure 2:
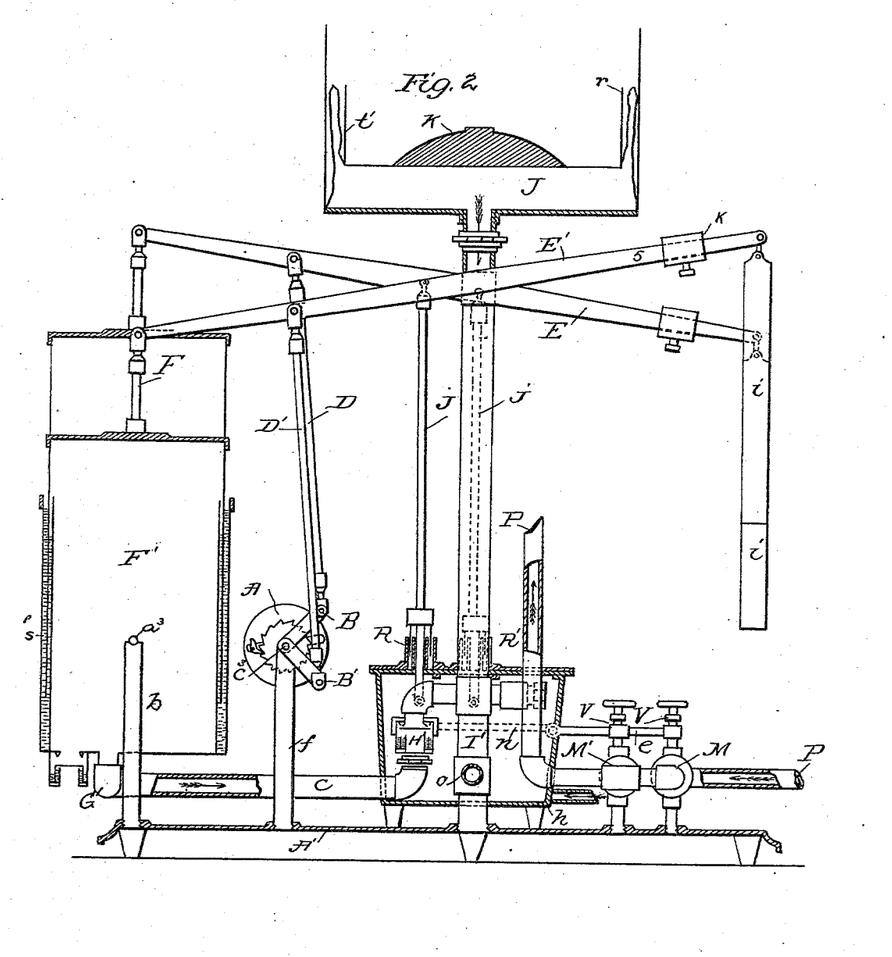
Fig. 2 is a side elevation, showing the blowers, receiver, (partly in section,) the connecting-pipes, and gasoline-tank.
Figure 3:
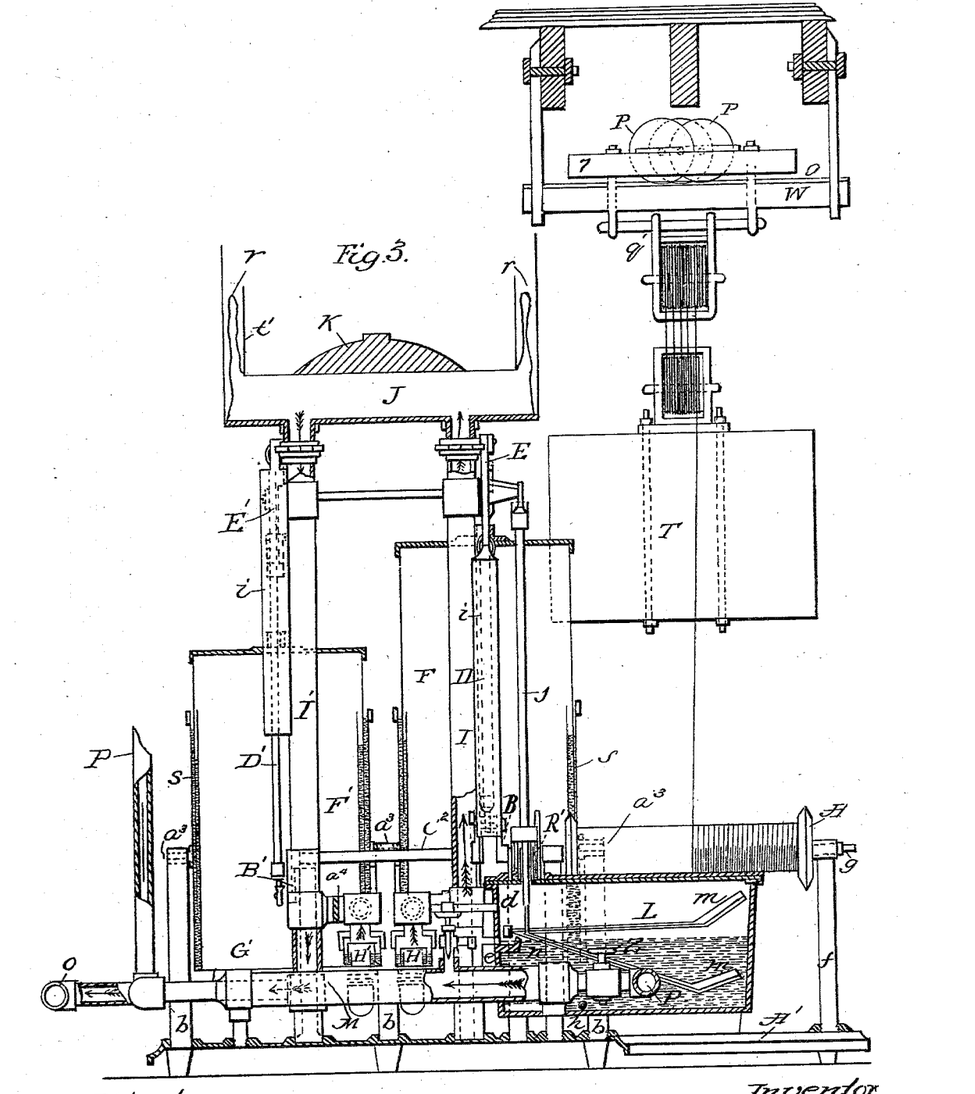
Fig. 3 is a side elevation of the apparatus one-quarter turned from the position of Fig. 2.

One difficulty attending the air-blowers commonly used in this class of machines is the inability to get adequate and continuous pressure in all cases and circumstances. Rotary blowers, having an outer case partly filled with water and an inner drum with buckets discharging air at stated intervals during its revolution do not furnish the proper pressure required in all cases and at the same time maintain a steady light. Attempt to increase the pressure beyond a certain point causes a too violent movement of the water by each bucket as it in turn is about to be exhausted of air. At this point there is an increased velocity of the drum, due to less resistance, and the succeeding bucket has to take increased or additional strain, and thereby raises the water or sets it in motion, and thus raises and depresses the lights. Another serious difficulty arises out of the use of this class of blowers involving the safety of the gas-machines—that is, the difficulty of cutting off communication between the carburetors and air-blowers and the outside air. In case the machines or their weights run down, it is possible in these machines for the gas or vapor to flow back from the carburetors through the blower into the room. These difficulties are not overcome in all points by the use of alternately-reciprocating domes, which have been suggested, since such reciprocating domes cause two dead-points in the revolution of the driving-shaft, which dead-points give an intermittent jerking action to the apparatus, detrimental to the working of the machine itself, and causing irregularity in the lights. These difficulties I have overcome by using, in connection with the reciprocating domes or blowers, a special arrangement of cranks in connection with a weighted receiver. This special construction and arrangement of the cranks and the relative action of the domes and receiver I have described in connection with said domes, though not claiming the blowers, broadly. These blowers are shown in Figs. 1, 2, and 3. They consist of domes F F', which play in liquid-seal chambers s s, these chambers being filled with any suitable non-freezing liquid which may be either lighter or heavier than water, the chambers being made of sufficient length in proportion to the specific gravity of the liquid used. I have shown in the drawings two of these domes working in such seals; but more domes may be used with certain advantages, as hereinafter explained. The two domes shown are connected to the walking-beams E E', which are pivoted upon offsets on the standards I I'. At the ends opposite the domes I suspend upon the beams counterbalancing-weights $i\ i$. I also place upon the beams weights $k\ k$, which are adjusted by sliding longitudinally on the beams, for purposes hereinafter explained. The weight T acts upon the spool A through the wire or cord, and the spool is connected to the shaft $C^2$ through a ratchet-wheel, $C^3$, to allow the spool to be turned backward in winding. On the shaft are set cranks B B', which the pitmen connect with the walking-beams. Steady action of the driving-shaft upon the blowers is a very important element in machines of this class. Were the two cranks set opposite each other, there would be two dead-points in the apparatus. These would cause the machine to act irregularly to such a degree as to greatly impair or totally destroy its efficiency. To overcome this I set the two cranks "quartering," and use, in connection with them, the re-receiver, which, with the special action of the quartering cranks, is explained further on.

At any suitable point, preferably at the bottom of the liquid-chambers s s, as shown in Fig. 2, are placed mercury-seal air-valves G G'. These consist of annular liquid-chambers and an inverted close-top cylinder of the general construction of the domes and seal-chambers, the edge of the inverted cylinder passing down into the quicksilver in the annular chamber. Projections above limit the upward movement of this cylinder; but it is sufficient to allow the air to pass into the dome whenever a partial vacuum is caused therein by the elevation of said dome, and upon the return of the dome the air is prevented from escaping from the valve; also, the valve falls and closes automatically at any time when the pressure within the dome is equal to or but a trifle less than that of the outside atmosphere. In order to keep the domes and seal-chambers in proper alignment with each other without the use of guides, which cause more or less friction, I suspend the latter upon trunnions 3, resting in standards $b\ b$, the said trunnions being located a little above the center of gravity of the seal-chamber. Instead of this the seal-chamber may be made slightly oval to permit the swaying movement of the dome as it is elevated and depressed by the walking-beams. The same object may be secured by enlarging the chambers above in one direction, so as to give an oval top and leave room for the sway of the dome.

I provide for the escape of the air from the domes through pipe C, which, when the seal-chamber is movable, should be of flexible material. These pipes lead to the receiver J, which is interposed between the blowers and the carburetor. It will be readily understood that if the blowers communicated directly with the carburetor there would be liability at certain times—as, for example, when the weight was winding—of cessation of pressure, which cessation would be felt at the burners; and it is to provide against any such intermission of pressure arising from momentary inaction of the weight or blowers or from any cause, that I provide the intermediate receiver, J. This receiver is represented in the drawings, Figs. 2 and 3, as mounted upon the standards I I'; but its position may be changed without modification of its action. The standards are made tubular for the passage of the air into and out of the receiver.

Referring to Fig. 1, it will be observed that the pipes C, leading from the bottom of the seal-chambers, are connected with a common horizontal pipe, X, which on the right hand, as shown in Fig. 3, communicates with the hollow standard I, but is closed at its opposite end by a partition, 4, so that the air from both blowers passes up in the direction of the arrow in standard I into the receiver J. From the receiver J it passes down through the hollow standard I' into the pipe O, as shown more clearly in Fig. 1. The receiver J is an open-top cylindrical vessel, air-tight, having a follower or bed, $t$, fitting loosely in the receiver, and provided with a weight, K. The follower $t$ is connected to the receiver by means of a tubular diaphragm, $r$. It is made of any suitable flexible air-tight material.

It will be understood from the description heretofore given that the weight K of the receiver acts in opposition to the work of the blowers and is constant in its action. It is therefore necessary that it should be prevented from reacting upon the blowers. Otherwise when the domes rise they would be filled by air returning from the receiver, and further vapor might in this way find passage back to the blowers. In order to prevent this, I place in the upright part of the pipes C C mercury-seal valves H H', as shown in Figs. 2 and 3. These valves are similar to the valves G G' heretofore described. These rise under pressure of air from the blowers, and when that pressure is withdrawn close under pressure of the air from the weighted receiver. The air from the receiver flows without check through the hollow standard I', as before stated, into the service-pipe O.

Referring, now, to the peculiar arrangement of the cranks B B', it will be observed that in the position shown in Fig. 2 both are rising and are lifting both domes. They are moving, therefore, without work, and are consequently gaining somewhat in speed; but they are moving the domes unequally, and there is no work until the leading crank has passed the dead-point, when dome F begins to descend, while F' is still rising. At this point reciprocation of movement occurs and continues till the second crank has passed the dead-point, when both domes are at work, but at different rates of speed. This simultaneous work continues till the leading crank has passed the lower dead-point, when alternate action commences; but it will be observed that the simultaneous action is unequal, and that it and the alternate action are taken up gradually, so that there is no jerking action, but only a regular breathing of the apparatus; but while the two domes are rising together the action of the receiver comes in. This is filled or supplied more or less when both domes descend together, and the air so forced into the receiver during the simultaneous descent of the domes is supplied to the carburetor during the interval of inaction of the blowers when they are rising together. For this action of the receiver it is necessary to nicely adjust the weight K. This weight can be determined upon by experiment when the machine is set up; but when once fixed it is inconvenient to change it. I therefore have provided the adjustable supplemental weights $k$, made to slide on the beams, and to be held at any point by set-screws. It will be obvious that the pumping force being constant and the weight K unchanged, there will be greater pressure in the pipes and at the burners; but increase in the number of lighted burners will increase the flow and diminish the pressure. It will therefore be desirable to diminish the counteracting-weight. This I do by sliding the weight $k$ toward the fulcrum, which is practically the same as diminishing K, as both act against the blowers. The position of the weights $k$ may be marked by figures on the beams, such figures indicating the number of burners for which the position of the figures is suited.

Figure 9:
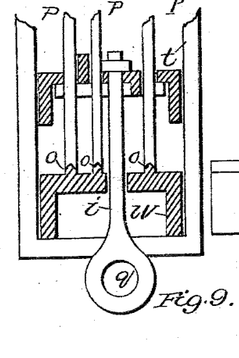
Figs. 9 and 10 are views of the traveling support for the weight.
Figure 10:
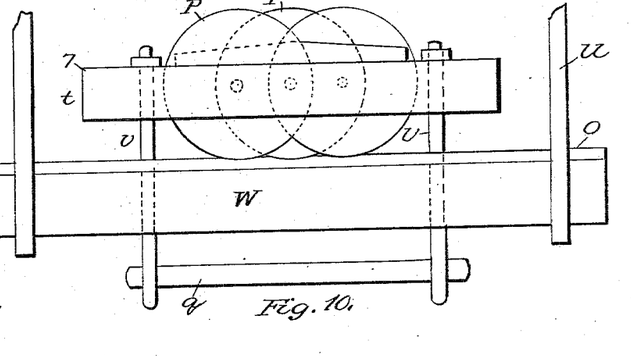

That part of the apparatus which gives motion to the walking-beams is shown in Fig. 3. These devices are to overcome certain difficulties in the operation of weights in machines heretofore used. One of these difficulties has been the limited length of the spool over which the wire or cord is wound, too great length causing said cord to wear out, and thus producing accident and annoyance. Further, as heretofore made, with the cord attached at a stationary point above, considerable friction is produced at the ends of the spool by reason of the spool being drawn against the bearings in which it revolves. This affects the steadiness of the light. Out of this latter difficulty has arisen the necessity of winding several successive coils upon the spool; but this causes variation in the action of the weight by reason of the variation in the diameter of the spools as the coil unwinds. This causes the light to diminish toward the end of the evening. In order to overcome these difficulties, I have provided a movable support for the attachment of the upper end of the wire or cord. This is represented in Fig. 3 at W, but is shown more clearly in Figs. 9 and 10 on an enlarged scale. The part W is a bar suitably supported at the ends and having tracks $o\ o$, on which the wheels $p\ p$ rest. These wheels carry a frame, 7, from which a bar, $q$, is suspended by bolts $v$, and from the bar $q$ the upper portion of the cord is suspended, so that as the cord winds upon the spool the carriage or frame 7 moves to keep the cord approximately vertical, which prevents any longitudinal strain upon the spool and consequent friction at the ends. Although I have shown three wheels supporting the carriage, it is obvious that a less number may be used. It is only necessary that the carriage should be made to run on a perfectly horizontal track and with the least possible friction. This apparatus makes it practicable to lengthen the spool sufficiently to take up all the cord that may be required for running the apparatus, and with the air-forcing apparatus and receiver heretofore described it is practicable to wind the cord upon this spool in a succession of coils, since the increased effect of the weight upon the outer coil may be taken up by the receiver J. Assuming that there is height enough for the weight T and sufficient length of cord for two or more coils upon the spool, and that the receiver J is large enough to receive all the air that the blower is capable of furnishing by the additional force imparted by the leverage of the second and third coils, the said receiver is balanced permanently for the pressure caused by the first coil. Then it follows that the excess of force exerted by the increased leverage of the outer coils will cause the air-holder to rise and fall with air. Whether the lights be burning or not, it will fill until the first coil is reached, when the pressure from the blower will fail to raise it farther, and the apparatus will remain in that position until the lights are in use, when the receiver will supply the air to the vaporizer out of this accumulation. When this is exhausted, the first coil takes up the whole duty, and there will be no apparent difference in pressure.

If it be desired at any time to wind up the weight T previous to the exhaustion of the air in the air-holder, it can be done without affecting the lights, as the air-holder will continue to supply the air during the cessation of the operation of the blowers. If, on the other hand, it be desired to wind up the weight after the exhaustion of the air from the receiver, it can be done by putting on the crank and for a moment turning in the direction of the action of the weight. The shaft and cranks may be operated, and through them the blowers, to supply air to the receiver, in order to maintain the lights during the winding, so that in no case need there be any diminution of pressure or supply of air. The pressure may be increased or diminished in the machine where circumstances require it either for an occasion or permanently by shortening or lengthening the sweep of the cranks. These cranks may be provided with a series of holes in which the wrist-pin may be changed; or the same effect may be produced by changing the location of the upper end of the connecting-arms D D' with the walking-beam; or additional weight may be added with proportionate increase of the weight K on the diaphragm of the receiver J. The blower can therefore be adjusted to conform to any case that may arise in relation to the matter of pressure.

From the description heretofore given it will be apparent that in case the weight should be allowed to run down or the blowers cease to act from any cause the floating part of the mercury-seal valves would immediately fall into the mercury and effectually cut off all communication with the outside air. Ordinarily these seals will be sufficient to sustain from five to ten times as much pressure from any cause as may be brought to bear upon them, and there is ample margin for security against any accidents.

It will be obvious that the capacity of the machine may be doubled by putting in place of the balancing-weights $i$ $i$ a duplicate of the domes F F' and their connections; but with this some additional proportioned weight will also be required. I may also add another dome upon the same side and extend the shaft $C^2$, provided with the additional crank-and-pitman connection and walking-beam. In such case the other cranks must be set upon the shaft on the "one-third," which will give a steady pressure without the use of the receiver, for the reason that one blower will always then be descending and apply the pressure. Still, even in such case the receiver has been required in order to compensate for inaction of the blowers when the weight needs to be wound when the lights are burning. It will of course be desirable always to give as great sweep as possible to the walking-beams.

I now proceed to describe the parts of my invention relating more directly to the carbureting process.

Heretofore great difficulty has been found in securing a uniform quality of illuminating-gas composed of air impregnated with vapors of gasoline of varying gravities, the air being sometimes overloaded with vapor and sometimes insufficiently supplied. This has rendered it necessary to use adjustable burners, which are in themselves objectionable. In the apparatus shown in Figs. 4 and 5, I have overcome this difficulty and rendered the vapor-mixture constantly uniform at all times during the operation of the machine.

Figures 4, 5:
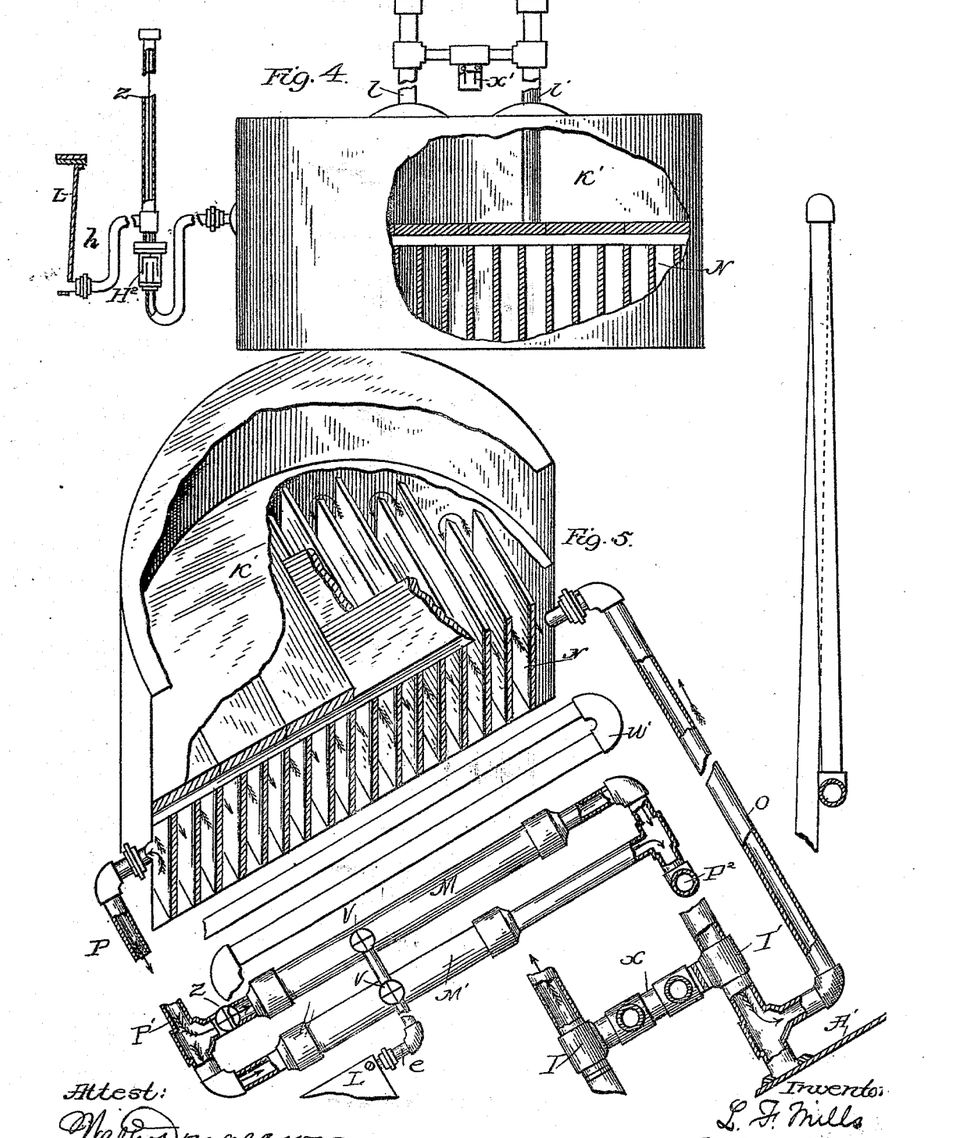
Fig. 4 shows a side elevation of the combined drip-carburetor and tank and connections with the gasoline-tank.
Fig. 5 represents the combined drip-carburetor and tank and its connections with the enriching-carburetors and with the gasoline-tank.

In Fig. 5, O represents the service-pipe heretofore mentioned. It is shown in its connection with the tubular standard I'. This pipe leads into a drip-carburetor, N, which has vertical partitions, leaving absorbent material and openings alternately above and below, so as to zigzag the current and cause it to go over increased space until it emerges into the pipe P on the other side. The pipe P leads through a coil, hereinafter described, into the pipe P', and thence into enriching-carburetors M M'. These enriching-carburetors are in connection with the pipe $P^2$, which leads to the distributing-pipes. From the supply-tank L, part of which is shown in Fig. 5, the gasoline is brought through a pipe, $e$, and valves V V into the enriching-carburetors M M', of which one or both may be used, one being capable of exclusion by the valve Z. These are placed a little higher than the drip-carburetor N, so that the gasoline will run down from them into M. They are supplied with any suitable absorbent linings, as shown more clearly in Fig. 6, and as hereinafter more fully described. It will be observed that the flow of the gasoline is in a direction contrary to the current of air. When the gasoline from the tank L enters the enriching-carburetors M M', it meets the current of air which is passed over the gasoline in the carburetor N, and is therefore more or less carbureted. Whatever it may lack of perfect saturation will be supplied in the carretors M M', since it there meets with a fresh supply of gasoline directly from the tank and charged with the lightest part of its vapors. The saturation of the air is therefore completed in these carburetors, and it is ready to discharge through the pipe $P^2$ into the distributing-pipes. The gasoline from the carburetors M, deprived of its lightest vapors, passes down through pipes, hereinafter described, to the carburetor N, passing all the way in contact with the air-current. When it reaches the carburetor N, it has already lost its lightest vapors; but it there meets the fresh or unsaturated air, which more readily absorbs the vapors. Thus the fresh air meets the partially-spent gasoline and the partially-saturated air meets the unspent gasoline, and the two currents effectually overlap and supplement each other.

At W', I have shown a coil intermediate between the carburetors N and M. This I locate in the ground below the frost-line, where the temperature will be approximately uniform. This pipe may be in form similar to steam-coils, and of any required length. One coil should have a slight fall in the direction of the passage of the air and the next in the opposite direction, &c. In passing, the air, previously more or less impregnated by the vapor of the heaviest or lowest gravity of gasoline, meets constantly as it advances lighter and still lighter gravity, until it comes in contact with the fresh gasoline in the enriching-carburetors M M'. The number of these enriching-carburetors may be increased at pleasure, and as many of them may be used as may be required, according to the temperature or capacity of the machine. The manner of arranging the asborbent material in these carburetors and coils may be varied. In that shown in Fig. 6 the outer case is made of ordinary gas-pipe of suitable size, having suitable reducers and outlet and inlet for the gas, P' P². The absorbent material $d'$ is represented as partially drawn out. It is supplied with a distributing-trough, $e^2$. (Shown in the section, which also represents an end view of the absorbent material in the form of spider-web.)

Figures 6, 7, 8:
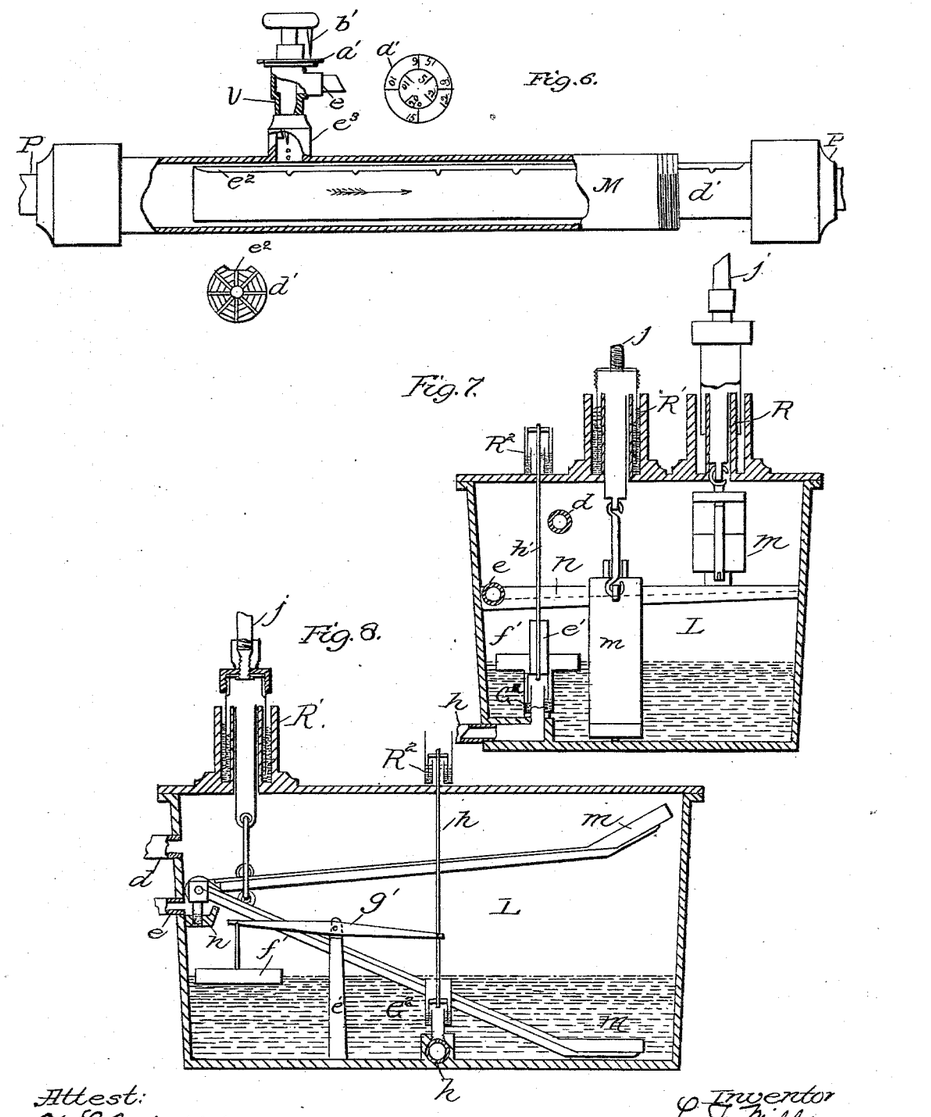
Fig. 6 is an enlarged view of an enriching-carburetor, part of the shell being broken away.
Figs. 7 and 8 represent sections of the gasoline-tank.

The valves V V on the carburetors M M' are also shown in Fig. 6. The inlet to the valve is shown at $e$. A disk, $a'$, is set above this upon the tube, as shown in face view on the right-hand side. It is provided with two rows of figures. $b'$ is an indicator attached to the wheel of the valve-stem to operate the needle. The figures on the disk are arranged according to the circumstances of the surrounding temperature where the machine is located, and also to average of summer and winter use. The figures represent the number of burners to which the indicator points. The valves may therefore be set for any given number of burners, and when so set the gasoline is caused to flow by drops or in increased quantity as the valves are opened. The lower part of the valve may have a partial case of glass, in order that the working may be plainly visible.

The tank L, connected to the carburetors M M' by the pipe $e$, is shown in position in Fig. 3 and on an enlarged scale in Figs. 7 and 8. The main feature in respect to this tank is the automatic apparatus located therein for supplying the gasoline to the carburetors in regulated amount—that is, in amounts constantly proportioned to the amount of air delivered from the blowers. I have ascertained by experiment that with gasoline of 87° density one cubic inch is required for each cubic foot of air. The gasoline is admitted into this tank from any suitable reservoir by means of the pipe $h$. In this pipe $h$, within the tank, is a mercury-seal valve, $G^2$, which is opened by the pressure from the gasoline-tank back of the pipe $h$; but the stem of the valve in the seal $G^2$ is connected by a lever, $g'$, to a float, $f'$, and when the float rises to a prescribed limit forces down the valve and closes the opening, shutting off the supply of gasoline from the pipe $h$. This insures a uniform depth of gasoline in the tank L. This uniformity (within reasonable limits) is required by reason of the automatic action of dippers $m$ $m$. These dippers are pivoted to a standard within a trough, $n$. The handles of the dippers are channeled, so that as one of the dippers is raised, as shown in Fig. 8, the gasoline dipped up runs down the handle and is discharged into the trough $n$, whence it passes by the pipe $e$, which opens into the said trough. The two dippers are made to act alternately by means of a rod, $j$, passing through a stuffing-box or mercury-seal, $R'$, to connections with the walking-beams, whereby each movement of the walking-beams, which causes one movement of the blowers, raises a certain amount of gasoline in the dippers and discharges it into the pipe $e$, and thence into the carburetors. The capacity of the dippers is adapted to that of the blowers, according to the principles heretofore laid down. The capacity of the grooved handles is slight, and for this reason exactness in depth of liquid is unnecessary.

The stem of the seal-valve $G^2$ (marked $h'$) extends up through the top of the tank, and is provided with a seal-valve, $R^2$. The position of the valve $R^2$ indicates to the observer the position of the valve $G^2$; but the stem may be raised by hand if at any time it be desired to have a larger amount of gasoline flow into the carburetors; or, if the walking-beams were not in motion, it might be desirable sometimes to give the apparatus an extra charge of gasoline for some special occasion; but ordinarily gasoline from the distributing-tank L is elevated into the trough by the automatic dippers. A pipe, $d$, is shown in the upper part of the distributing-tank L, which connects directly with the air-service pipe O, for the purpose of equalizing the pressure in the tank with the other parts of the apparatus, and avoid resistance to the gasoline in passing through the pipe $e$.

From the description of the apparatus given it will be seen that even if the valves V were left wide open no excess of gasoline could pass into the carburetors, since its flow is governed by the dippers, which are regulated by the motion of the domes. Obviously the valve $G^2$ may be moved in direct combination with the float $f'$ to feed the gasoline without the use of the dippers, but perhaps with not the same certainty of action.

Referring to Fig. 4, it will be observed that the storage-tank K' is located directly over the drip-carburetor N, being formed, in fact, out of the same cylinder with the horizontal separating-partition. This tank is in connection with the distributing-tank L through pipes, as shown on the left-hand side of the figure. It will be obvious that it is impracticable to make free connection between the storage-tank and the distributing-tank; and difficulty has been heretofore found in producing a cock or valve capable of holding gasoline fit for the purpose between the tank or carburetor, or vessel intermediate between the carburetor and tank. I overcome this difficulty by means of the mercury-seal valves—such as heretofore described—inside the tank L. In case I do not use this automatic valve, I may use a similar valve, with devices for operating it by hand. This is shown at $H^2$ in the aforesaid figure. This valve is to be operated by hand, and is arranged to resist the pressure of gasoline in the tank K'. It may be lifted by removing the cap of the rod $z$, which is attached to the float in the valve. The float may then be lifted, when the gasoline will escape by its own weight or pressure. The flow is arrested by simply letting go the stem; but should it be held up at any time too long the liquid will find its way into the tank L and enriching-carburetors M M' into the drip-carburetor, and, as aforesaid, should the valves V be closed, it would find its way through the pipe d, pipe O, to the same place, and in no case can the apparatus be made to leak if properly constructed.

It will be obvious that when the lights are turned out the machine ceases to blow and to lift gasoline until they are turned on again; but any gasoline remaining in the trough or in the pipes will run through the valve into the enriching-carburetor, and thus the machine will be properly charged and always ready for lighting. The valve V, therefore, need not be closed, but remain open for ordinary use.

In case it be desired to arrest action of the machine at any time, a cord may be attached to one end of a walking-beam and led to any desired point in the house, where it may be drawn upon and the motion of the walking-beam arrested.

Figure 13:
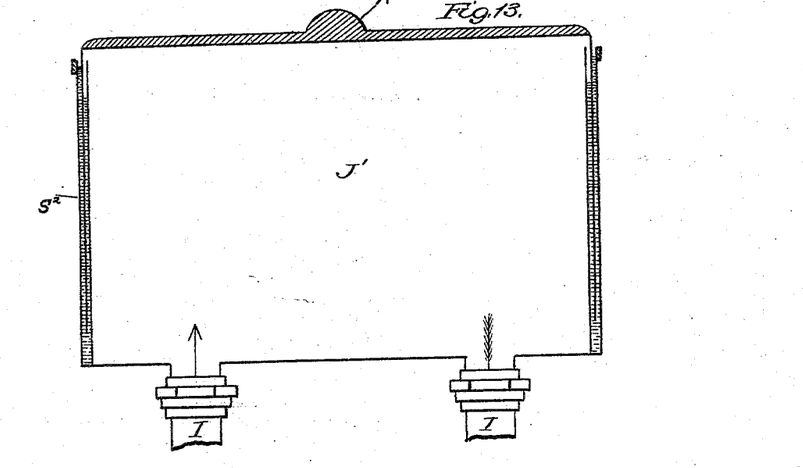
Figs. 13 and 14 represent modified forms of the receivers.
Figure 14:
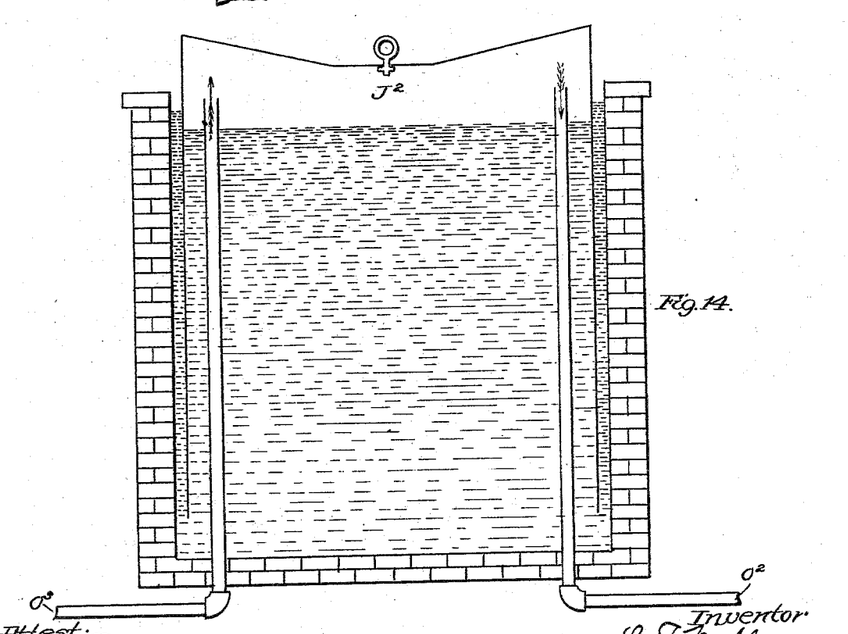

In Figs. 13 and 14 I have shown modifications of the air-receiver J. The construction of the first, J', will be obvious from an inspection of the figure, it being similar to the domes and seal-chambers heretofore described. The tank $J^2$ (shown in Fig. 14) is adapted for greater capacity, and to be located upon the floor or base of the machine, instead of being elevated upon the columns, as is the case with the other forms. This receiver is adapted for use in connection with an apparatus in which the cord is wound in several coils upon the spool, and is designed to be balanced permanently for the pressure caused by the first coil, as heretofore explained. The pipes $O^2$ $O^3$ take the place of the pipes in the standards I I'.

Figure 11:
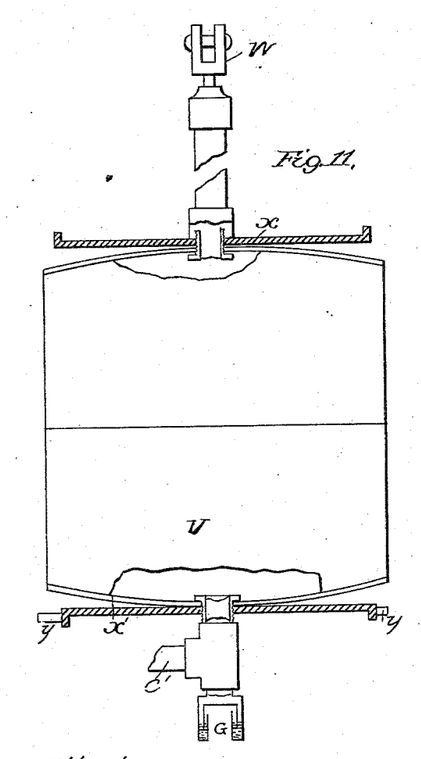
Figs. 11 and 12 represent a modification of the blower.
Figure 12:
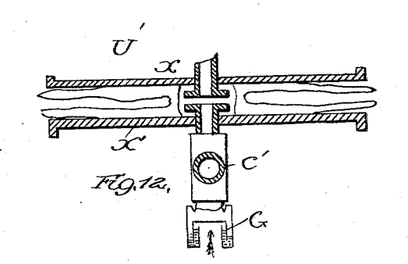
Figure 15:
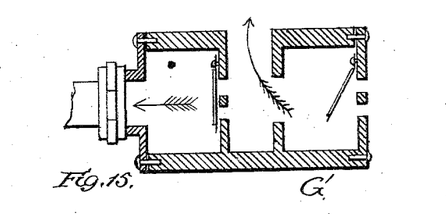
Fig. 15 represents a detached view of the valves.

In Figs. 11 and 12 I have shown a form of blowers which may be designated as "dry blowers." In these figures U represents a rubber bag, made to expand, as in Fig. 11, or to close, as in Fig. 12. It is operated between two plates, $x$ $x'$, the latter of which is provided with small trunnions, adapted to rest on standards b b, heretofore described. These are adapted to be connected to the walking-beams in the manner heretofore explained. A dry blower may also be made by arranging in the space occupied by the liquid in the chambers s s a diaphragm, of rubber or leather, attached on the one side to the circumference of the outer chambers and on the other to the walls of the domes F F'. These diaphragms are to be operated by the walking-beams E E' in the same manner as the diaphragm of receiver J, all the valves and other connections being the same, substantially as heretofore described. The dry valves, Fig. 15, provided with rubber or leather flaps, with metallic backing, may be used in some cases in lieu of outlet or mercury-seal valves H H'.

I may state, also, as an advantageous modification of the blowers, that the seal-chambers may be made for the domes on one side in one apartment, so that the domes will work in one body of liquid instead of in separate bodies. This maintains the seal at the same level. If blowers are added at the other end of the walking-beams, the seal-chambers may be made in the same manner, and the two connected by a suitable pipe, so as to make a liquid communication between two seal-chambers. The cranks being set on the "one-quarter" or "one-third, as the case may be, would maintain an equilibrium of pressure, thus avoiding absolutely any dead-point caused by the crank.

In cold latitudes, or exposed positions, it may be found desirable to supply heat to the drip-carburetor. This can be done by packing around it, in a suitable way, common stable-manure, supplying it as the cold season approaches each year. This is intended to include only the drip, it being desirable to dispose of it under any change of circumstances, and in such case the storage-tank could be made and set separate from the drip carburettor. Lower gravities of gasoline also could be used by such an arrangement, the lower gravities being much cheaper.

The apparatus described may be used to enrich coal or other fixed gas by introducing the gas into the domes, whence it finds its way through the machine to the burners in the same way as the air. The machine in this case may become a measuring and recording instrument, and records accurately, there being no leather diaphragms to shrink or expand. Of course the air can be used with such mixture, if desirable. In case gas be used from ordinary gas-works, the pressure in the pipes will be sufficient to operate the machine.

I propose to set the supply-tank in the earth below the frost-line, so that it will not be subject to the variations of atmospheric temperature. I also place upon the filling-pipe $l$ a mercury-seal, $x'$, of lighter weight than the interior seals heretofore described, which hold the vapors back from entering the apartment. This relative adjustment of the seals will cause any undue pressure to be discharged through the seal in the pipe $l$ to the open air.

I do not limit myself to the exact details of the construction shown in the carburetors, my invention in this respect being capable of modification, retaining the essential principle in which the air-current and the gasoline-stream have the described overlap, whereby the air is uniformly impregnated and residuum avoided.

Having thus described my invention, what I claim as new, and desire to secure by Letters Patent, is—

1. In a carbureting apparatus, the combination of a pair of blowers operated by walking-beams and by pitmen connected to cranks set quartering, a storage chamber or reservoir intermediate between the blowers and the carburetor, a positively-operating weight within the reservoir for forcing the air into the pipe leading to the carburetor, and suitable valves to prevent back-pressure from the reservoir to the blower, substantially as described.

2. In a machine of the class described, the combination of the walking-beams having balance-weights at one end and connected to the blowers at the other, a shaft, C, and pitmen D D', connected to the walking-beams and to cranks B B', set quartering upon the shaft C, all substantially as described.

3. The combination, in the described machine, of the domes operated from a crank-shaft through intermediate pitmen-connections, and the pivoted or enlarged seal-chambers, substantially as described.

4. In the described machine, the combination of the blowers, the pipes C C, valves H H', tubular supporting-columns I I', and the intermediate weighted receiver, J, substantially as described.

5. In a machine for carbureting gas or air, the pipe O, drip-carburetor N, enriching-carburetor M, liquid-pipe $e$, connected with the tank, and pipes between the carburetors M and N, substantially as described.

6. In the described apparatus, the distributing-tank L, pivoted dippers $m\ m$, operated by the rods $j$ from the walking-beams, and the trough and pipe connections, with the carburetor, substantially as described.

7. The combination, in a machine of the class described, of the drip-carburetor, pipe O, enriching-carburetors M M', valves V, liquid-supply $e$, and valve Z, whereby greater or less amount of vapor can be supplied to the air or gas, as set forth.

8. The combination, in the tank L, of the seal-valve $G^2$, rod $h'$, and outside seal-valve, $R^2$, substantially as described.

In testimony whereof I have signed my name to this specification in the presence of two subscribing witnesses.

LUCIUS F. MILLS.

Witnesses:
F. L. MIDDLETON,
DAVID H. MEAD.